US010703295B2

(12) United States Patent
Leff Yaffe et al.

(10) Patent No.: US 10,703,295 B2
(45) Date of Patent: Jul. 7, 2020

(54) PICKUP TRUCK HAVING CARGO BED WITH ELEVATED BICYCLE RACK

(71) Applicant: FORD GLOBAL TECHNOLOGIES, LLC, Dearborn, MI (US)

(72) Inventors: Jonatan Leff Yaffe, Mexico City (MX); Carlos Emilio Merino, Mexico City (MX); Luis Manuel Garcia, Mexico City (MX); Pedro Montoya, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 15/298,315

(22) Filed: Oct. 20, 2016

(65) Prior Publication Data
US 2018/0111563 A1 Apr. 26, 2018

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .................................. B60R 9/10; B60R 9/06
USPC ...... 224/403, 405, 402, 924; 211/17, 18, 19, 211/20, 21, 22
See application file for complete search history.

(56) References Cited

U.S. PATENT DOCUMENTS

| 4,057,182 | A | * | 11/1977 | Kolkhorst | B60R 9/10 224/403 |
| 4,934,572 | A | * | 6/1990 | Bowman | B60R 9/00 211/17 |
| 4,976,386 | A | | 12/1990 | Geiger | |
| 5,037,019 | A | * | 8/1991 | Sokn | B60R 9/00 224/403 |
| 5,078,276 | A | | 1/1992 | Rogge et al. | |
| 5,127,564 | A | | 7/1992 | Romero | |
| 5,255,951 | A | | 10/1993 | Moore, III | |
| 5,257,728 | A | * | 11/1993 | Gibson | B60R 9/08 224/321 |
| 5,427,286 | A | * | 6/1995 | Hagerty | B60R 9/00 211/18 |
| 5,445,300 | A | * | 8/1995 | Eipper | B60R 9/06 224/496 |
| 5,611,472 | A | * | 3/1997 | Miller | B60R 9/00 211/22 |

(Continued)

OTHER PUBLICATIONS

DG Manufacturing, "Bicycle Support Instructions—Drawing Fig 4,5,6,7" "http://www.discountramps.com/images/art/truck-bed-bicycle-support-instructions.pdf".

(Continued)

*Primary Examiner* — Nathan J Newhouse
*Assistant Examiner* — Lester L Vanterpool
(74) *Attorney, Agent, or Firm* — David Coppiellie; King & Schickli, PLLC

(57) ABSTRACT

An apparatus for supporting a bicycle having wheels and a frame relative to a cargo bed of a pickup truck having a tailgate, spaced sidewalls and a front wall. The apparatus comprises holders for associating with the spaced sidewalls and adapted for engaging one of the wheels of the bicycle. The apparatus further includes a support for associating with the front wall to support the frame of the bicycle. The holders and support may be height-adjustable to accommodate a variety of bicycle shapes and sizes.

16 Claims, 4 Drawing Sheets

(56) References Cited

U.S. PATENT DOCUMENTS

| | | | | |
|---|---|---|---|---|
| 5,709,521 A * | 1/1998 | Glass | ...................... | B60R 9/042 |
| | | | | 224/310 |
| 5,794,828 A * | 8/1998 | Colan | ...................... | B60R 9/10 |
| | | | | 224/42.38 |
| 5,836,490 A * | 11/1998 | Price | ...................... | B60R 9/00 |
| | | | | 224/403 |
| 6,149,039 A * | 11/2000 | Englander | ............... | B60R 9/042 |
| | | | | 224/310 |
| 6,179,181 B1 * | 1/2001 | Johnson | ................... | B60R 9/00 |
| | | | | 211/20 |
| 6,382,480 B1 | 5/2002 | Egly et al. | | |
| 6,398,091 B1 * | 6/2002 | Munoz | ...................... | B60R 9/00 |
| | | | | 224/402 |
| 6,547,115 B1 * | 4/2003 | Kato | ......................... | B60R 9/06 |
| | | | | 224/311 |
| 6,679,408 B1 * | 1/2004 | Thomas | .................. | B60P 3/075 |
| | | | | 224/403 |
| 6,698,810 B1 | 3/2004 | Lane | | |
| 6,722,541 B1 | 4/2004 | Aftanas et al. | | |
| 6,766,913 B2 * | 7/2004 | Steen | ...................... | B68C 1/002 |
| | | | | 211/193 |
| 6,846,140 B2 | 1/2005 | Anderson et al. | | |
| 7,165,704 B2 * | 1/2007 | Lo | ............................. | B60R 9/06 |
| | | | | 224/499 |
| 7,641,086 B2 | 1/2010 | Green | | |
| 8,047,412 B2 * | 11/2011 | Premartin | .................. | B60R 9/06 |
| | | | | 224/314 |
| 8,118,202 B1 | 2/2012 | Price | | |
| 8,794,493 B2 | 8/2014 | Cauley et al. | | |
| 8,820,811 B1 * | 9/2014 | Hemphill | .................. | B60R 9/00 |
| | | | | 248/222.52 |
| 8,905,280 B2 * | 12/2014 | Martin | ...................... | B60R 9/00 |
| | | | | 224/405 |
| 9,159,254 B2 | 10/2015 | Oyoung | | |
| 9,248,784 B2 * | 2/2016 | Kraeuter | ................... | B60P 3/40 |
| 9,254,792 B2 | 2/2016 | Patton et al. | | |
| 9,493,123 B2 * | 11/2016 | Martin | ...................... | B60R 9/00 |
| 2003/0089751 A1 * | 5/2003 | Munoz | ...................... | B60R 9/06 |
| | | | | 224/492 |
| 2006/0196906 A1 | 9/2006 | Gibson | | |
| 2007/0110539 A1 | 5/2007 | Klinkman et al. | | |
| 2011/0068140 A1 | 3/2011 | Stevens et al. | | |
| 2011/0266322 A1 * | 11/2011 | Jones | ........................ | B60R 9/08 |
| | | | | 224/567 |
| 2014/0117062 A1 | 5/2014 | Kraeuter et al. | | |
| 2014/0124551 A1 * | 5/2014 | Condon | .................... | B60R 9/10 |
| | | | | 224/324 |
| 2015/0060636 A1 | 3/2015 | Erickson | | |
| 2015/0231780 A1 | 8/2015 | Hirokawa et al. | | |
| 2015/0329059 A1 | 11/2015 | Jobe | | |
| 2018/0022398 A1 * | 1/2018 | Schlaupitz | ......... | B62D 33/0207 |
| | | | | 224/405 |

OTHER PUBLICATIONS

Office Action dated Jan. 23, 2018 regarding U.S. Appl. No. 15/298,355, filed Oct. 20, 2016.

Office Action dated Nov. 6, 2018 regarding U.S. Appl. No. 15/298,355, filed Oct. 20, 2016.

Office Action dated Jul. 8, 2019 regarding U.S. Appl. No. 15/298,355, filed Oct. 20, 2016.

* cited by examiner

PICKUP TRUCK HAVING CARGO BED WITH ELEVATED BICYCLE RACK

TECHNICAL FIELD

This document relates generally to the motor vehicle field and, more particularly, to a pickup truck with a cargo bed having an elevated bicycle rack.

BACKGROUND

Conventionally, when a pickup truck user desires to transport one or more bicycles, the options are to place the bicycles in the vehicle cabin, to arrange them inside of the cargo area or to provide a suitable third-party bicycle carrier. Placing the bicycle in the vehicle interior risks soiling and/or damage to the vehicle and possibly the bicycle. In turn, placing the bicycles in the cargo area, either fully assembled or partially disassembled, for example by removing of one or both bicycle tires, risks the bicycles to move around, potentially getting damaged and limiting available cargo space for additional items.

Thus, a need is identified for an improved apparatus for supporting a bicycle in a vehicle and, in particular, a cargo bed of a pickup truck.

SUMMARY

In accordance with the purposes and benefits described herein, a pickup truck having a cargo bed with an elevated bicycle rack is provided. According to one aspect of the disclosure, an apparatus for forming the rack in the cargo bed includes holders for associating with the spaced sidewalls and adapted for engaging one of the wheels of the bicycle. A support is also provided for associating with the front wall to support the frame of the bicycle.

In one embodiment, each holder is height adjustable to an elevated position above the cargo bed. Each holder may also be adapted for being at least partially recessed within one of the spaced sidewalls bounding the cargo bed. The holders may each include a cradle adapted for receiving a part of one wheel of the bicycle.

The support may be height adjustable to an elevated position above the cargo bed. The support may further be adapted for connecting to the front wall. In one embodiment, the support comprises a vertical portion connected to a first transverse portion for engaging the front wall and a second transverse portion adapted for engaging the frame of the bicycle. One or more of the holders or the support includes a strap for wrapping around the wheels or frame of the bicycle.

According to a further aspect of the disclosure, a pickup truck is adapted for transporting a bicycle having wheels and a frame in a travel direction. The truck includes a cargo bed having sidewalls spaced in a direction transverse to the travel direction. A holder on each sidewall serves to engage or hold one wheel of the bicycle when oriented with the wheels spaced apart in the transverse direction.

In one embodiment, each sidewall includes an upper surface from which the holder projects in a deployed position. The holder may include a portion recessed within a corresponding one of the sidewalls and extendable therefrom to an elevated position. The truck may further include a tailgate, a front wall spaced from the tailgate in the travel direction, and a support may be provided for connecting to the front wall for supporting the frame of the bicycle. The support may be height-adjustable to allow for a variety of bicycle sizes and shapes to be accommodated. One or both of the holder or the support may include a cradle for receiving the wheels or frame of the bicycle.

Still a further aspect of the disclosure pertains to a pickup truck adapted for transporting a bicycle having wheels and a frame in a travel direction. The truck comprises a cargo bed having sidewalls spaced in a direction transverse to the travel direction, a tailgate, and a front wall spaced from the tailgate in the travel direction. A height-adjustable support is connected to the front wall for supporting the frame of the bicycle.

In a further embodiment, holders may be provided on the sidewalls for receiving the wheels of the bicycle. The support may be mounted to the front wall. One or both of the holders or the support includes a cradle for receiving the wheels or frame of the bicycle.

In the following description, there are shown and described several preferred embodiments of an elevated bicycle rack for a cargo bed of a pickup truck. As it should be realized, the arrangement is capable of other, different embodiments and its several details are capable of modification in various, obvious aspects all without departing from the cargo bed having an elevated bicycle rack, as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of a cargo bed having an elevated bicycle rack and, together with the description, serve to explain certain principles thereof. In the drawing figures.

Reference will now be made in detail to the present preferred embodiments of a cargo bed having an elevated bicycle rack, examples of which are illustrated in the accompanying drawing figures.

DETAILED DESCRIPTION

Figure 1:
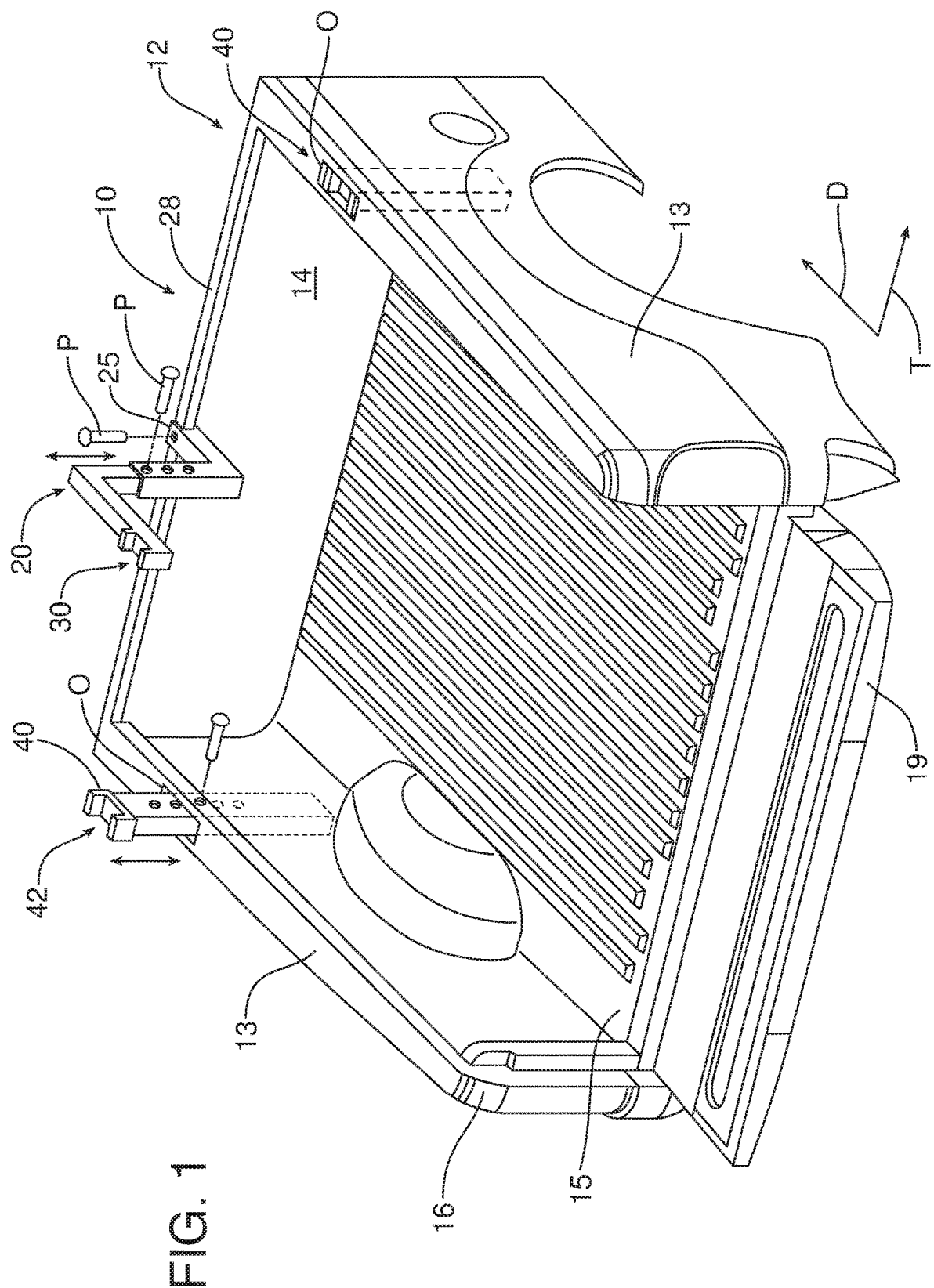
FIG. 1 is a perspective view of a cargo bed, such as for a pickup truck or like vehicle, including an elevated bicycle rack.

Referring to FIG. 1, a pick-up truck 10 includes a cargo bed 12 forming the rearward portion thereof. The cargo bed 12 includes generally vertical, upright side walls 13 spaced apart in a direction transverse T to a travel direction D of the vehicle 10, a front wall 14, and a floor 15. The frame of the vehicle 10 includes a generally vertical D-pillar 16 located at the rearward end of the cargo bed 12 adjacent the pivoted tailgate 19. The tailgate 19 extends transversely above the floor 15 between the side walls 13 at the rearwardmost portion of the cargo bed 12. The tailgate 19 is pivotally mounted to the floor 15 and is movable between an upright closed position that is oriented perpendicularly to the floor 15 and generally opposite the front wall 14, and a lowered open position that forms an extension of the floor 15 rearwardly of the side walls 13.

Figure 2:
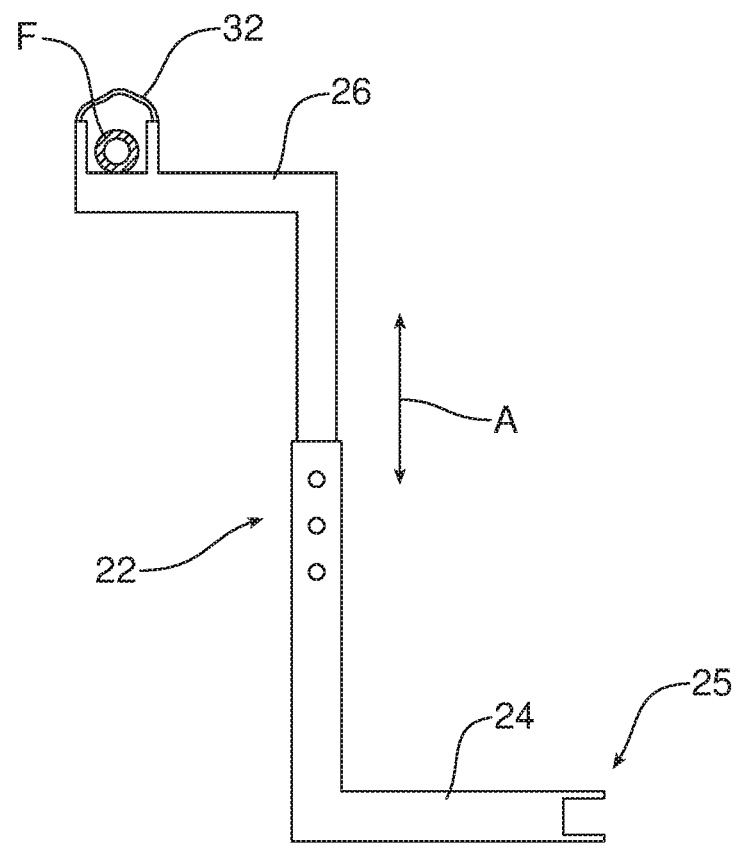
FIG. 2 is a side view of a support for supporting a bicycle frame in connection with a cargo bed.
Figure 3:
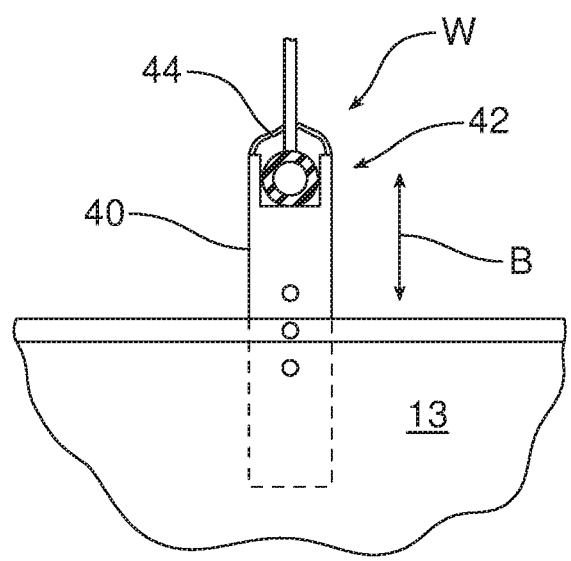
FIG. 3 is a side view of a holder for holding a bicycle wheel in connection with a cargo bed.
Figure 4:
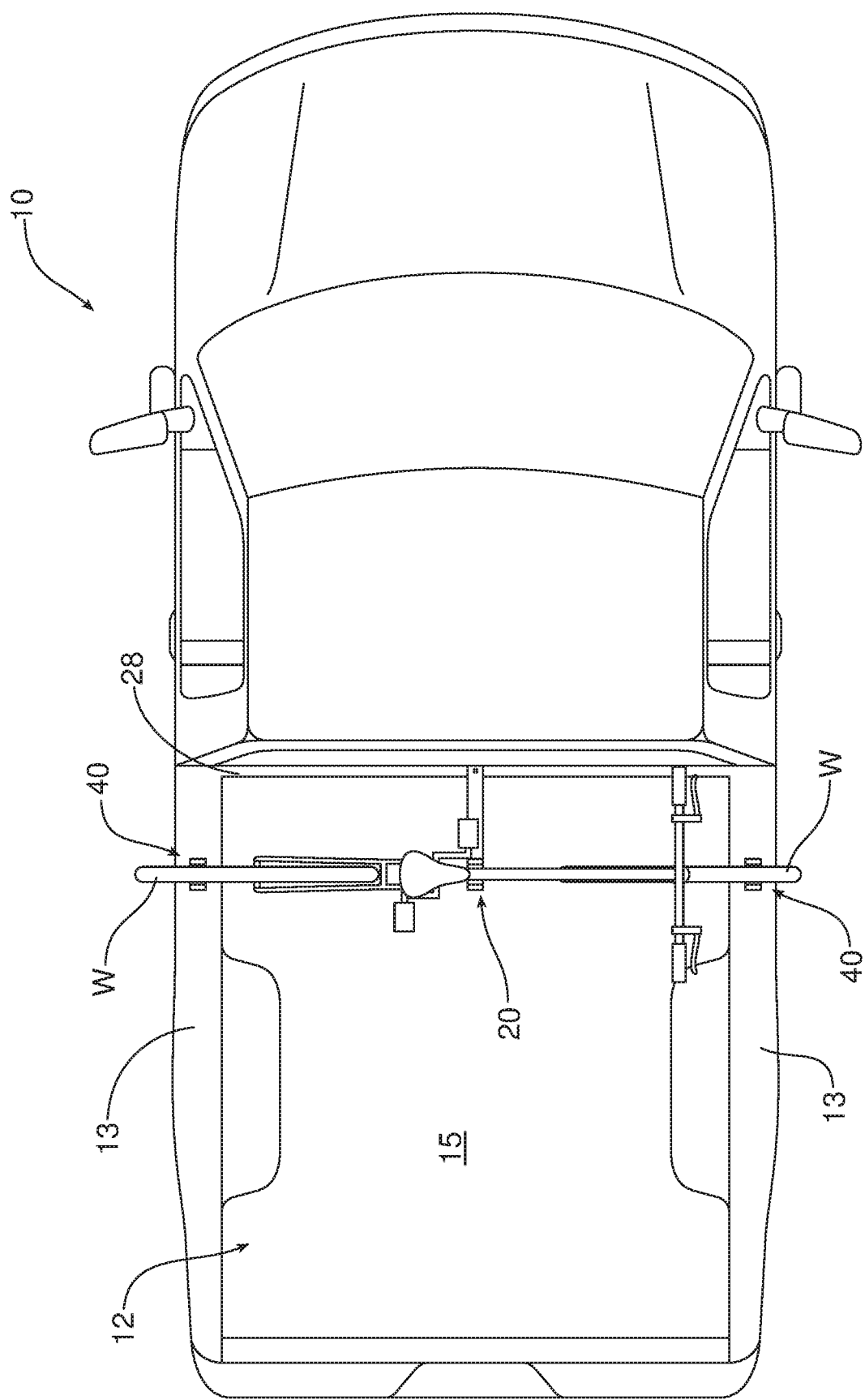
FIG. 4 is a top view of a cargo bed with the support and holders supporting a bicycle.

According to one aspect of the disclosure, and with further reference to FIGS. 2, 3, and 4, the bed 12 is provided with an apparatus for supporting a bicycle in a stable condition during transport by the vehicle 10. In order to support a bicycle frame, a support 20 may be provided for connecting to the front wall 14 of the bed 12. As perhaps best understood with reference to FIG. 2, the support 20 may comprise a generally vertical portion 22 connected to spaced transverse portions 24, 26. The lower transverse portion 24 in the upright condition includes a connector, such as a clevis 25, which may receive a railing 28 extending along a portion of the bed 12, such as along an upper portion of the front wall 14, but below the cab. A fastener, such as a bolt or pin P (or several bolts/pins), may be used to complete the connection with the railing 28 in a secure and stable, yet releasable manner, thereby connecting the support 20 to the front wall 14.

Additionally or optionally, the upper transverse portion 26 may include a cradle 30 adapted for receiving holding the bicycle frame F when the bicycle is oriented in a transverse direction (along with an optional strap 32 associated with the support 20). The cradle 30 may be generally U-shaped to receive the frame F in a vertical direction when the support is oriented as illustrated in the mounted condition. The vertical portion 22 of the support may be made in a telescoping fashion to allow for height adjustability (note arrow A), and a suitable bolt or pin P may be passed and register with aligned apertures at the selected height.

Individual support for each wheel W of the bicycle may be provided by a holder 40 provided along each sidewall 13 of the bed 12. The holder 40 may be at least partially recessed within the corresponding sidewall 13 and in an extended condition may project through an opening O therein to allow for height adjustability (note arrow B). Along an upper portion, the holder 40 may include an optional cradle 42 for receiving the wheel W. In the stowed condition, the cradle 42 may be flush with the upper surface of the sidewall 13, or recessed within the opening O, and a suitable cap or cover (not shown) may be provided. A strap 44 may also be associated with each holder 40 to assist in retaining the wheel W in the engaged position.

In use, the support 20 and holders 40 may be deployed to the desired elevation above the bed 12 to support the bicycle via the frame F and wheels W. In this manner, the bicycle is securely stored in a desirable upright condition at three points of connection (which helps avoid sliding, swinging, or rocking) without contacting the floor 15 (which keeps the bed open for receiving cargo). The support 20 is also fully height adjustable to avoid creating issues in low clearance situations (and also variable for different sizes or shapes of bicycles in view of the independent adjustability of the support 20 and the holders 40). Dismantling of the bicycle for transport is also unnecessary.

When not in use, the holders 40 may simply be stowed, and the support 20 released from the mounted position for ready storage in the cargo bed 12 or otherwise. Alternatively, the support 20 may be adapted to remain connected to the vehicle 10 and simply pivot between the stowed and deployed positions. While it is desirable for each of the support 20 and the holders 40 to be fully and independently height adjustable, it is also an option to make only the holders 40 height adjustable (in which case the support 20 would be at a fixed height), or the make only the support height adjustable (in which case the holders 40 would be at a fixed height). The support 20 may also be provided with multiple cradles (not shown), and a corresponding number of holders may be provided to accommodate multiple bicycles.

The foregoing description has been presented for purposes of illustration. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for supporting a bicycle having wheels and a frame relative to a pickup truck with a cargo bed having a rear tailgate, spaced sidewalls on opposite sides of the cargo bed and a front wall, comprising:
   holders for connecting with the spaced sidewalls, each holder adapted for engaging one of the wheels of the bicycle extending across said cargo bed between said spaced sidewall and each holder is height adjustable to an elevated position above the cargo bed; and
   a support for connecting with the front wall to support the frame of the bicycle.

2. The apparatus of claim 1, wherein each holder includes a cradle adapted for receiving a part of one wheel of the bicycle.

3. The apparatus of claim 1, wherein the support is height adjustable to an elevated position above the cargo bed.

4. The apparatus of claim 1, wherein the support is adapted for connecting to the front wall.

5. The apparatus of claim 1, wherein the support comprises a vertical portion connected to a first transverse portion for engaging the front wall and a second transverse portion adapted for engaging the frame of the bicycle.

6. The apparatus of claim 1, wherein one or more of the holders or the support includes a strap for wrapping around the wheels or frame of the bicycle.

7. A pickup truck including the apparatus of claim 1, with the holders connected to the spaced sidewalls and the support connected to the front wall, whereby the frame of the bicycle may be oriented with a longitudinal axis transverse to a travel direction of the pickup truck.

8. A pickup truck adapted for transporting a bicycle having wheels and a frame in a travel direction, comprising:
   a cargo bed having sidewalls spaced in a direction transverse to the travel direction; and
   a holder on each sidewall for engaging one wheel of the bicycle when oriented with the wheels spaced apart in the transverse direction, wherein the holder includes a portion recessed within a corresponding one of the sidewalls and extendable therefrom to an elevated position.

9. The pickup truck of claim 8, wherein each sidewall includes an upper surface from which the holder projects in a deployed position.

10. The pickup truck of claim 8, further including a tailgate, a front wall spaced from the tailgate in the travel direction, and a support connected to the front wall for supporting the frame of the bicycle.

11. The pickup truck of claim 10, wherein the support is height adjustable.

12. The pickup truck of claim 10, wherein the support is mounted to the front wall.

13. The pickup truck of claim 12, wherein the holder or the support includes a cradle for receiving the wheels or frame of the bicycle.

14. A pickup truck adapted for transporting a bicycle having wheels and a frame in a travel direction, comprising:
- a cargo bed having sidewalls spaced in a direction transverse to the travel direction, a tailgate, and a front wall spaced from the tailgate in the travel direction;
- a height-adjustable support connected to the front wall for receiving and supporting the frame of the bicycle when oriented transverse to the travel direction; and
- holders associated with the sidewalls for receiving the wheels of the bicycle, wherein each holder is height adjustable to an elevated position above the cargo bed.

15. The pickup truck of claim 14, wherein one or more of the holders or the support includes a cradle for receiving the wheels or frame of the bicycle.

16. The pickup truck of claim 14, wherein the support is mounted to an upper portion of the front wall.

* * * * *